United States Patent
Asai (10) Patent No.: US 11,760,143 B2
(45) Date of Patent: Sep. 19, 2023

(54) TOWING HOOK ATTACHMENT STRUCTURE

(71) Applicant: TOYOTA JIDOSHA KABUSHIKI KAISHA, Toyota (JP)

(72) Inventor: Tetsuya Asai, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 287 days.

(21) Appl. No.: 17/096,153

(22) Filed: Nov. 12, 2020

(65) Prior Publication Data
US 2021/0221187 A1   Jul. 22, 2021

(30) Foreign Application Priority Data
Jan. 17, 2020 (JP) .................................. 2020-005736

(51) Int. Cl.
*B60D 1/48* (2006.01)
*B60D 1/04* (2006.01)
*B60D 1/52* (2006.01)

(52) U.S. Cl.
CPC .............. *B60D 1/488* (2013.01); *B60D 1/04* (2013.01); *B60D 1/52* (2013.01)

(58) Field of Classification Search
CPC . B60D 1/04; B60D 1/488; B60D 1/52; B60D 1/565; B60D 1/00; B60D 1/48; B60D 1/56; B62D 21/07; B62D 21/08; B62D 21/09; B62D 21/15
See application file for complete search history.

(56) References Cited

U.S. PATENT DOCUMENTS

| | | | | |
|---|---|---|---|---|
| 4,645,227 A | * | 2/1987 | Callahan ................. | B60D 1/56 280/495 |
| 5,054,806 A | * | 10/1991 | Chester ................... | B60D 1/48 280/495 |
| 6,434,907 B1 | * | 8/2002 | Simboli ................. | B62D 24/02 296/205 |
| 9,272,592 B1 | * | 3/2016 | Kringstad ............. | B60D 1/485 |
| 2005/0236808 A1 | * | 10/2005 | Lier ........................ | B60D 1/52 280/495 |
| 2016/0082796 A1 | * | 3/2016 | Fincher ................... | B60D 1/54 280/474 |

FOREIGN PATENT DOCUMENTS

| | | | |
|---|---|---|---|
| DE | 0069231 A1 * | 5/1982 | ............. B60D 1/52 |
| DE | 10 2012 022 613 A1 | 5/2014 | |
| JP | 2019-064516 A | 4/2019 | |
| WO | WO-2012140930 A1 * | 10/2012 | ............. B60D 1/488 |

* cited by examiner

*Primary Examiner* — Jacob D Knutson
*Assistant Examiner* — Abigail R Hymel
(74) *Attorney, Agent, or Firm* — Sughrue Mion, PLLC (57) ABSTRACT

A first crossmember is divided into a right crossmember and a left crossmember. A right fastened portion of a towing hook is inserted into the right crossmember, and a bolt is fastened by being passed through a bolt insertion hole of the right crossmember and a bolt insertion hole of the right fastened portion of the towing hook. A left fastened portion of the towing hook is inserted into the left crossmember, and a bolt is fastened by being passed through a bolt insertion hole of the left crossmember and a bolt insertion hole of the left fastened portion of the towing hook. Hereby, the attachment strength of the towing hook can be secured sufficiently, and even in a case where an input at the time of towing of a vehicle is excessive, the towing can be performed successfully.

5 Claims, 6 Drawing Sheets

TOWING HOOK ATTACHMENT STRUCTURE

CROSS-REFERENCE TO RELATED APPLICATION

This application claims priority to Japanese Patent Application No. 2020-005736 filed on Jan. 17, 2020, incorporated herein by reference in its entirety.

BACKGROUND

1. Technical Field

The present disclosure relates to a towing hook attachment structure. More particularly, the present disclosure relates to improvement to increase the attachment strength of a towing hook.

2. Description of Related Art

Conventionally, towing hooks are attached to the front and rear sides of a vehicle. The towing hooks are used to tow the vehicle when the vehicle breaks down. Also, the towing hooks are used to tightly bind the vehicle to a vessel, a car carrier trailer, or the like at the time of transportation of the vehicle.

Japanese Unexamined Patent Application Publication No. 2019-64516 (JP 2019-64516 A) describes, as a towing hook attachment structure, a structure configured such that a towing hook is fastened by a bolt to a bottom face of a crossmember. More specifically, a generally U-shaped towing hook projecting forward in the vehicle-body front-rear direction is fixed to the bottom face of the crossmember by a fastener such as a bolt and a nut.

SUMMARY

However, the towing hook attachment structure described in JP 2019-64516 A has such a possibility that the attachment strength of the towing hook becomes insufficient when an input at the time of towing is excessive. On this account, a towing hook attachment structure that can sufficiently secure the attachment strength of a towing hook when an input at the time of towing is excessive has been demanded.

The present disclosure is accomplished in view of such a problem, and an object of the present disclosure is to provide a towing hook attachment structure that can sufficiently secure the attachment strength of a towing hook even in a case where an input at the time of towing is excessive.

In order to achieve the above object, means for solving the problems in the present disclosure is based on a towing hook attachment structure in which a towing hook is fastened to a crossmember of a vehicle body. The towing hook attachment structure includes the towing hook. The towing hook attachment structure is configured such that: the crossmember is provided with a towing hook fastening portion; the towing hook is provided with a fastened portion; either one of the towing hook fastening portion of the crossmember and the fastened portion of the towing hook has an insertion hole extending along the vehicle width direction and opened in the vehicle width direction; the other one of the towing hook fastening portion of the crossmember and the fastened portion of the towing hook is inserted into the insertion hole; and the fastened portion of the towing hook is fastened to the towing hook fastening portion of the crossmember such that a bolt is passed through respective bolt insertion holes formed in the towing hook fastening portion and the fastened portion in an aligned manner.

As such, when a second member (e.g., the fastened portion of the towing hook) is inserted into a first member (e.g., the towing hook fastening portion of the crossmember) having an insertion hole, and the first member and second member are fastened by a bolt, it is possible to sufficiently secure the attachment strength of the towing hook in comparison with a structure in the related art in which a towing hook is fastened to an outer surface of a crossmember by a bolt. On this account, even in a case where an input at the time of towing of a vehicle is excessive, the towing can be performed successfully.

As a more specific structure, the insertion hole may be provided in the towing hook fastening portion of the crossmember, and the fastened portion of the towing hook may be inserted into the insertion hole.

In this structure, a towing load input into the towing hook at the time of towing of the vehicle is transmitted to the towing hook fastening portion of the crossmember via the fastened portion of the towing hook and the bolt. Accordingly, even in a state where the towing load is large, the towing load can be received in a large range, so that the towing can be performed successfully.

Further, the crossmember may be divided into a right crossmember and a left crossmember. A left end part of the right crossmember in the vehicle width direction and a right end part of the left crossmember in the vehicle width direction may serve as towing hook fastening portions. The towing hook fastening portions may have respective insertion holes extending along the vehicle width direction and opened in the vehicle width direction. Both end parts of the towing hook in the vehicle width direction may serve as fastened portions. The fastened portion placed on the right side of the towing hook in the vehicle width direction may be inserted into the insertion hole of the towing hook fastening portion of the right crossmember and fastened by a bolt. The fastened portion placed on a left side of the towing hook in the vehicle width direction may be inserted into the insertion hole of the towing hook fastening portion of the left crossmember and fastened by a bolt.

In this structure, the fastened portions on both sides of the towing hook in the vehicle width direction are supported by bolt fastening in a state where the fastened portions are inserted into the towing hook fastening portions of the right and left crossmembers. Hereby, a towing load input into the towing hook at the time of towing of the vehicle is transmitted to the right crossmember and the left crossmember via the fastened portions of the towing hook and the bolts, and even in this case, the towing load can be received in a large range, so that the towing can be performed successfully.

Further, in this structure, the towing hook is placed between the right and left crossmembers, so that the position of the towing hook in the vehicle-body front-rear direction can overlap the position of the crossmember in the vehicle-body front-rear direction. On this account, the front end position of the towing hook can be placed rearward in comparison with a case where the towing hook is fastened to the outer surface of the crossmember like the related art (a structure in which the position of the towing hook in the vehicle-body front-rear direction does not overlap the position of the crossmember in the vehicle-body front-rear direction and a locking portion (a part to which a towing-side hook extending from a towing-car side is locked) of the towing hook is placed greatly forward from the crossmember; an exemplary case of a towing hook provided on the front side of the vehicle body). In order to highly obtain usability of the towing hook, it is necessary to secure the magnitude of the towing hook to some extent. However, with the present disclosure, the front end position of the towing hook can be placed rearward while the magnitude of the towing hook is secured to some extent (the front end position of the towing hook can be placed rearward as compared to the towing hook in the related art without changing the position of the crossmember). On this account, a collision load at the time of a vehicle front collision (e.g., at the time of a minor collision) can be successfully absorbed by a vehicle body frame by inputting the collision load into a front end portion (e.g., a crash box) of the vehicle body frame. Hereby, it is possible to restrain a collision object from reaching the position of the towing hook, without employing means in which the length of the front end portion of the vehicle body frame in the vehicle-body front-rear direction is lengthened so as to increase a collision load absorption region. On this account, it is possible to avoid or restrain input of a collision load into the crossmember or a part of the vehicle body frame, the part being placed rearward from the crossmember (a part of the vehicle body frame that is placed rearward from the connecting position where the crossmember is connected).

Further, it is conceivable that the towing hook is placed to face diagonally downward (diagonally downward toward the front side in the vehicle-body front-rear direction) as means in which the front end position of the towing hook is placed rearward while the magnitude of the towing hook is secured to some extent. In this case, the position of the towing hook might be placed below a line of a so-called approach angle (a tangent of an outer surface of a wheel, the tangent passing through a lower end of a bumper). In the present disclosure, without placing the towing hook to face diagonally downward, the front end position of the towing hook can be placed rearward while the magnitude of the towing hook is secured to some extent. Accordingly, it is possible to restrain the position of the towing hook from being placed below the line of the approach angle, thereby making it possible to restrain the towing hook from interfering with a road surface at the time of hill-climbing traveling. Further, in comparison with a case where the towing hook is placed to face diagonally downward or a case where the towing hook is fastened to the bottom face of the crossmember (JP 2019-64516 A), the ground clearance of the disposition position of the towing hook can be set to be high. This also makes it possible to restrain the towing hook from interfering with a road surface.

Further, in the related art, the towing hook is placed forward from the crossmember, and it is necessary to change the position of the crossmember to rearward so that the position of the towing hook is placed rearward. However, in the present disclosure, the position of the towing hook in the vehicle-body front-rear direction overlaps the position of the crossmember in the vehicle-body front-rear direction, and therefore, it is possible to place the position of the towing hook rearward without changing the position of the crossmember to rearward. On this account, it is possible to effectively prevent interference with a member (e.g., a radiator or the like) placed behind the crossmember or the towing hook.

As such, in the present disclosure, while a restriction on the front side, a restriction on the lower side, and a restriction on the rear side as restrictions on the disposition position of the towing hook are all satisfied, it is possible to secure excellent usability of the towing hook. Further, as described earlier, it is not necessary to lengthen the length of the front end portion of the vehicle body frame in the vehicle-body front-rear direction, it is possible to sufficiently obtain a degree of freedom in design of the front part of the vehicle body.

The above operation effects can be also obtained when the present disclosure is applied to a towing hook provided on the rear side of the vehicle body.

Further, inside-diameter dimensions of the bolt insertion holes formed in the towing hook fastening portion of the crossmember and the fastened portion of the towing hook may be set to be larger than an outside-diameter dimension of the bolt.

In this structure, in a state where no towing load is input into the towing hook, slight gaps are formed between an outer surface of the bolt and an inner surface of the bolt insertion hole formed in the fastened portion of the towing hook and between the outer surface of the bolt and the inner surface of the bolt insertion hole formed in the towing hook fastening portion of the crossmember. For example, in some cases, a gap may be formed between the outer surface of the bolt and an inner surface of the bolt insertion hole formed in the fastened portion of the towing hook, the inner surface being on a side opposite to a side where the towing load is applied. Further, in some cases, a gap may be formed between the outer surface of the bolt and an inner surface of the bolt insertion hole formed in the towing hook fastening portion of the crossmember, the inner surface being on the side where the towing load is applied. That is, in a case where the present disclosure is applied to the towing hook provided on the front side of the vehicle body, a gap may be formed on the rear side of (behind) the bolt, between the fastened portion of the towing hook and the bolt, and a gap may be formed on the front side of (in front of) the bolt, between the towing hook fastening portion of the crossmember and the bolt. When a towing load is applied to the towing hook in this state, a gap between the bolt and the towing hook is reduced due to a relative movement of the towing hook to the bolt, so that the fastened portion of the towing hook abuts with the outer surface of the bolt, and further, a gap between the crossmember and the bolt is reduced due to a relative movement of the bolt to the crossmember, so that the towing hook fastening portion of the crossmember abuts with the outer surface of the bolt. That is, the towing load input into the towing hook is transmitted to the bolt from the fastened portion of the towing hook and is transmitted from the bolt to the towing hook fastening portion of the crossmember. Hereby, the towing load can be received by these members, so that the towing can be performed successfully.

Further, in this case, in a state where no towing load is applied to the towing hook, a sum of a dimension, in the vehicle-body front-rear direction, of a gap between an outer surface of the bolt and an inner surface of the bolt insertion hole formed in the fastened portion of the towing hook, the inner surface being on a side opposite to a side where the towing load is applied, and a dimension, in the vehicle-body front-rear direction, of a gap between the outer surface of the bolt and an inner surface of the bolt insertion hole formed in the towing hook fastening portion of the crossmember, the inner surface being on the side where the towing load is applied, may be equal to a dimension, in the vehicle-body front-rear direction, of a gap between the fastened portion of the towing hook and an inner surface of the insertion hole formed in the towing hook fastening portion of the crossmember, the inner surface being on the side where the towing load is applied.

In this configuration, when the towing load is applied to the towing hook, due to relative movements of the towing hook and the bolt to the crossmember, a gap between the outer surface of the bolt and the fastened portion of the towing hook (a gap between the outer surface of the bolt and the inner surface of the bolt insertion hole formed in the fastened portion of the towing hook, the inner surface being on the side opposite to the side where the towing load is applied) is reduced, a gap between the outer surface of the bolt and the towing hook fastening portion of the crossmember (a gap between the outer surface of the bolt and the inner surface of the bolt insertion hole formed in the towing hook fastening portion of the crossmember, the inner surface being on the side where the towing load is applied) is reduced, and a gap between the towing hook fastening portion of the crossmember and the fastened portion of the towing hook (a gap between the fastened portion of the towing hook and the inner surface of the insertion hole formed in the towing hook fastening portion of the crossmember, the inner surface being on the side where the towing load is applied) is also reduced. Accordingly, the fastened portion of the towing hook abuts with the towing hook fastening portion of the crossmember, and the bolt abuts with the towing hook fastening portion of the crossmember. That is, the towing load input into the towing hook is directly transmitted from the fastened portion of the towing hook to the towing hook fastening portion of the crossmember and is transmitted from the bolt to the towing hook fastening portion of the crossmember. Hereby, the towing load can be received by these members. Particularly, the towing load to be received by the crossmember can be increased (the towing load is directly transmitted from the fastened portion of the towing hook to the towing hook fastening portion of the crossmember, so that the towing load to be received by the crossmember can be increased), thereby resulting in that towing can be performed successfully.

In the present disclosure, one of the towing hook fastening portion of the crossmember and the fastened portion of the towing hook has an insertion hole, and the other one of them is inserted into the insertion hole. Further, the fastened portion of the towing hook is fastened to the towing hook fastening portion of the crossmember such that a bolt is passed through respective bolt insertion holes formed in the towing hook fastening portion and the fastened portion in an aligned manner. Hereby, the attachment strength of the towing hook can be secured sufficiently, and even in a case where an input at the time of towing of a vehicle is excessive, the towing can be performed successfully.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described below with reference to the drawings. The present embodiment deals with a case where the present disclosure is applied as an attachment structure for a front towing hook attached to a vehicle body frame constituted as a so-called ladder frame.

Schematic Structure of Vehicle Body Frame

Figure 1:
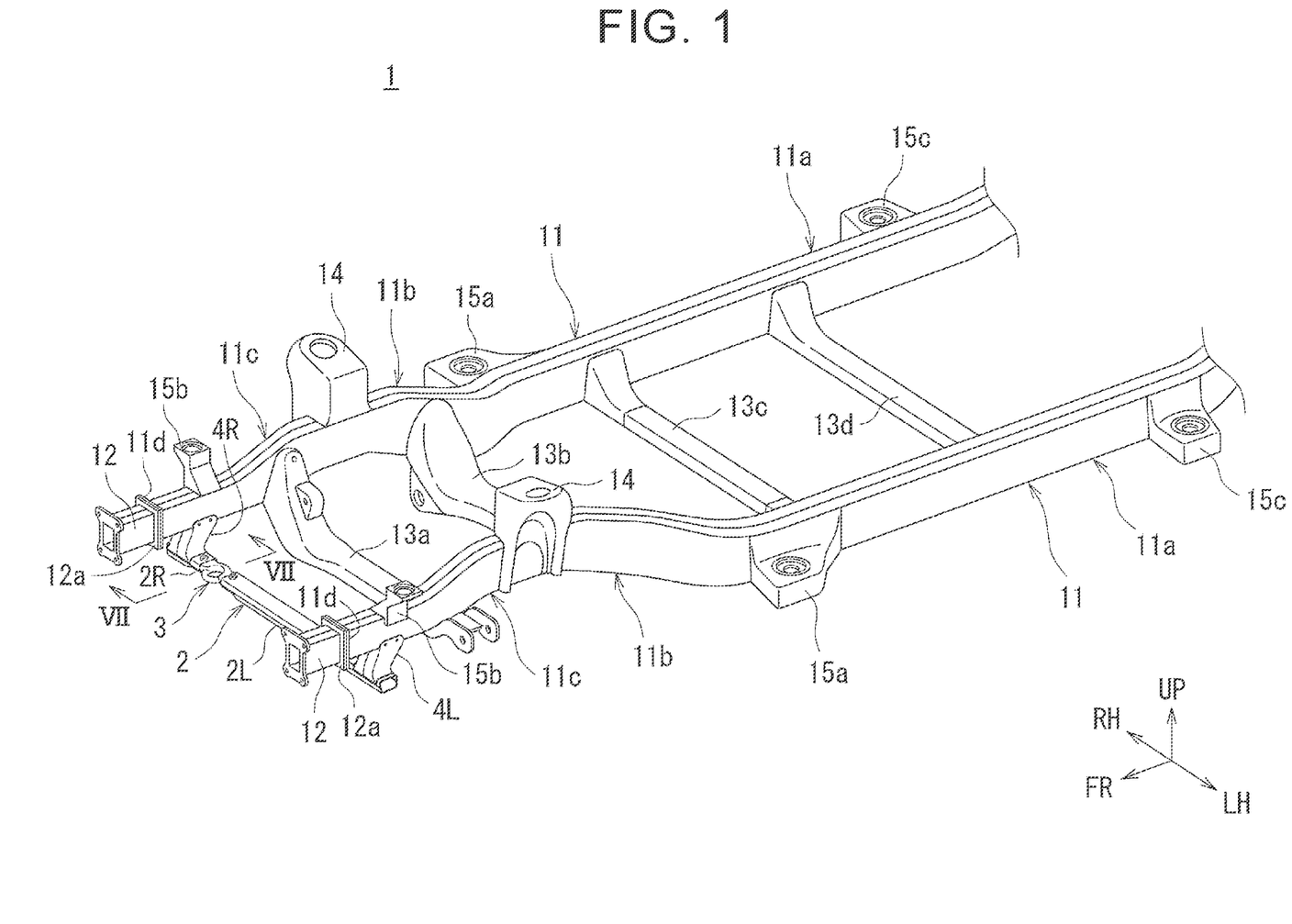
FIG. 1 is a perspective view illustrating a front part of a vehicle body frame according to an embodiment.

FIG. 1 is a perspective view illustrating a front part of a vehicle body frame 1 according to the present embodiment. Note that, in FIG. 1, an arrow FR indicates the front side in the vehicle-body front-rear direction, an arrow UP indicates the upper side in the vehicle-body up-down direction, an arrow RH indicates the right side in the vehicle-body right-left direction, and an arrow LH indicates the left side in the vehicle-body right-left direction.

As illustrated in FIG. 1, the vehicle body frame 1 includes a pair of right and left side rails 11 provided on both outer sides in the vehicle width direction so as to extend along the vehicle-body front-rear direction. Each of the side rails 11 is constituted by a closed-section structure and includes an intermediate portion 11a, a front kick portion 11b, and a front portion 11c continuous with each other along the vehicle-body front-rear direction. Further, although not illustrated herein, a rear kick portion is provided behind each of the intermediate portions 11a.

The intermediate portion 11a extends horizontally along the vehicle-body front-rear direction within a predetermined range between the disposition position of a front wheel (not shown) and the disposition position of a rear wheel (not shown).

The front kick portion 11b is continuous with a front end of the intermediate portion 11a and has a shape curving upward toward the front side in the vehicle-body front-rear direction. The front portion 11c is continuous with a front end of the front kick portion 11b and extends forward in the vehicle-body front-rear direction. The front wheel is disposed outward of the front portion 11c in the vehicle width direction. On this account, in consideration of interference with the front wheels, the dimension, in the vehicle width direction, between the front portions 11c of the side rails 11 (the dimension between the right and left front portions 11c) is set to be shorter than the dimension, in the vehicle width direction, between the intermediate portions 11a (the dimension between the right and left intermediate portions 11a). Because of this, the front kick portions 11b have a shape curving outward in the vehicle width direction toward the rear side in the vehicle-body front-rear direction.

A pair of right and left crash boxes 12 configured to absorb energy (a collision load) at the time of a vehicle front collision is provided such that the crash boxes 12 are connected to respective front sides of the front portions 11c of the right and left side rails 11. More specifically, flanges 11d are provided in respective front ends of the front portions 11c of the side rails 11, and flanges 12a are provided in respective rear ends of the crash boxes 12. The flanges 11d are connected to the flanges 12a by means such as bolting in an overlapped manner. The crash boxes 12 are configured to reduce a collision load to be transmitted to the side rails 11 such that the crash boxes 12 are compressed and deformed upon receipt of a collision load at the time of a vehicle front collision and absorb the collision load. Further, a bumper reinforcement (not shown) extending along the vehicle width direction is provided over between front end portions of the right and left crash boxes 12.

A plurality of crossmembers 2, 13a to 13d extending along the vehicle width direction is provided over between the side rails 11. In the figure, a reference sign 2 indicates a first crossmember, a reference sign 13a indicates a second crossmember, a reference sign 13b indicates a third crossmember, a reference sign 13c indicates a fourth crossmember, and a reference sign 13d indicates a fifth crossmember.

The front portions 11c of the side rails 11 are provided with metal suspension support brackets 14 projecting outwardly in the vehicle width direction such that the suspension support brackets 14 are disposed at a position between the second crossmember 13a and the third crossmember 13b.

Further, cab mount brackets 15a, 15b, 15c are disposed in a rear end portion of the front kick portion 11b of the side rail 11, a front end portion of the front portion 11c of the side rail 11, and a rear end portion of the intermediate portion 11a of the side rail 11. The cab mount brackets 15a, 15b, 15c project outwardly in the vehicle width direction, and cab mounts (not shown) are attached thereto. Then, a cabin (not shown) is connected to the side rails 11 via the cab mounts and the cab mount brackets 15a, 15b, 15c.

Attachment Structure for Towing Hook

Descriptions are now made of an attachment structure for a towing hook as a feature of the present embodiment.

A towing hook 3 is attached to the first crossmember 2. The towing hook 3 is used to tow the vehicle when the vehicle breaks down. Also, the towing hook 3 is used to tightly bind the vehicle to a vessel, a car carrier trailer, or the like at the time of transportation of the vehicle.

Figure 2:
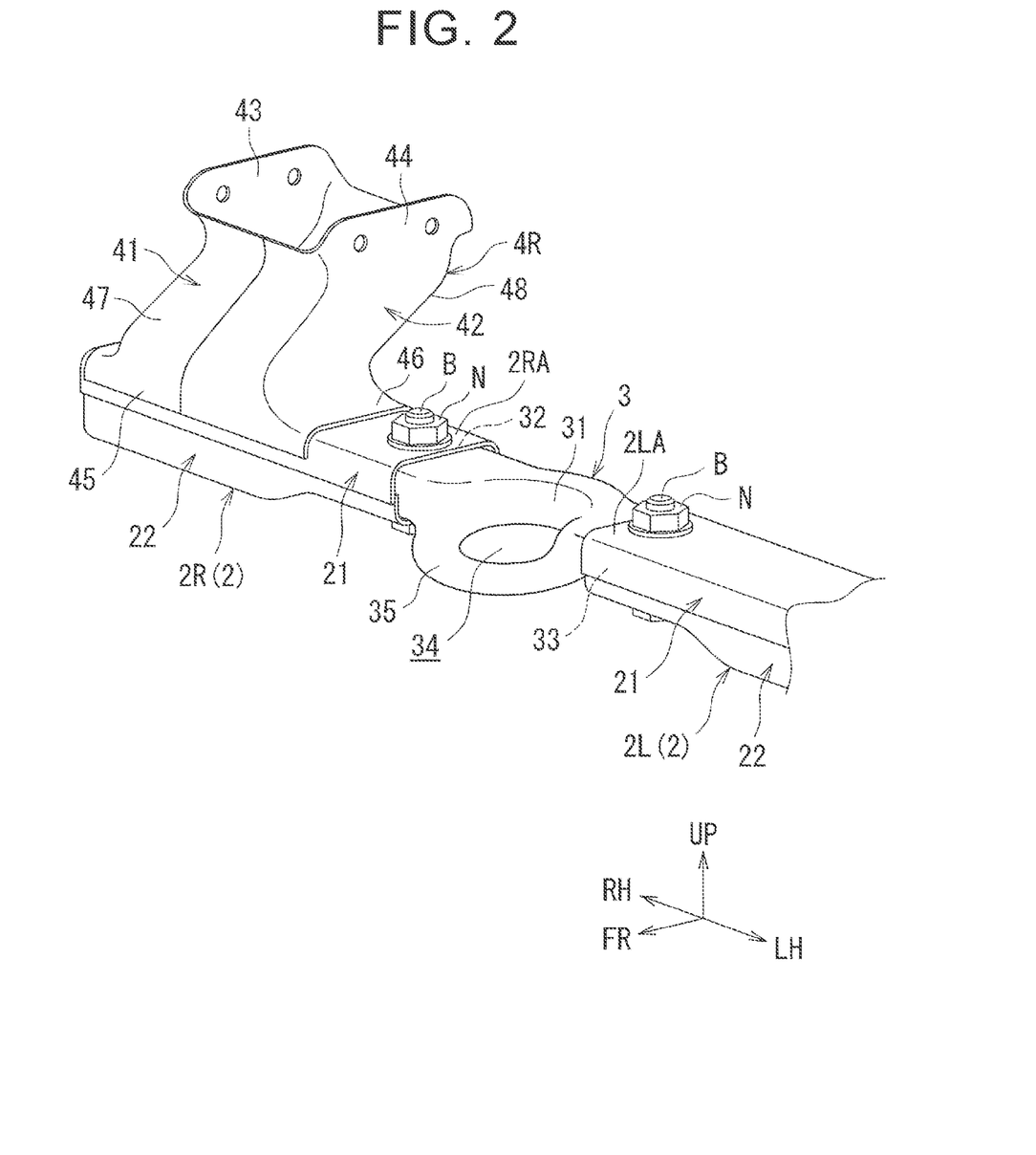
FIG. 2 is a perspective view illustrating a peripheral area around a towing hook.
Figure 3:
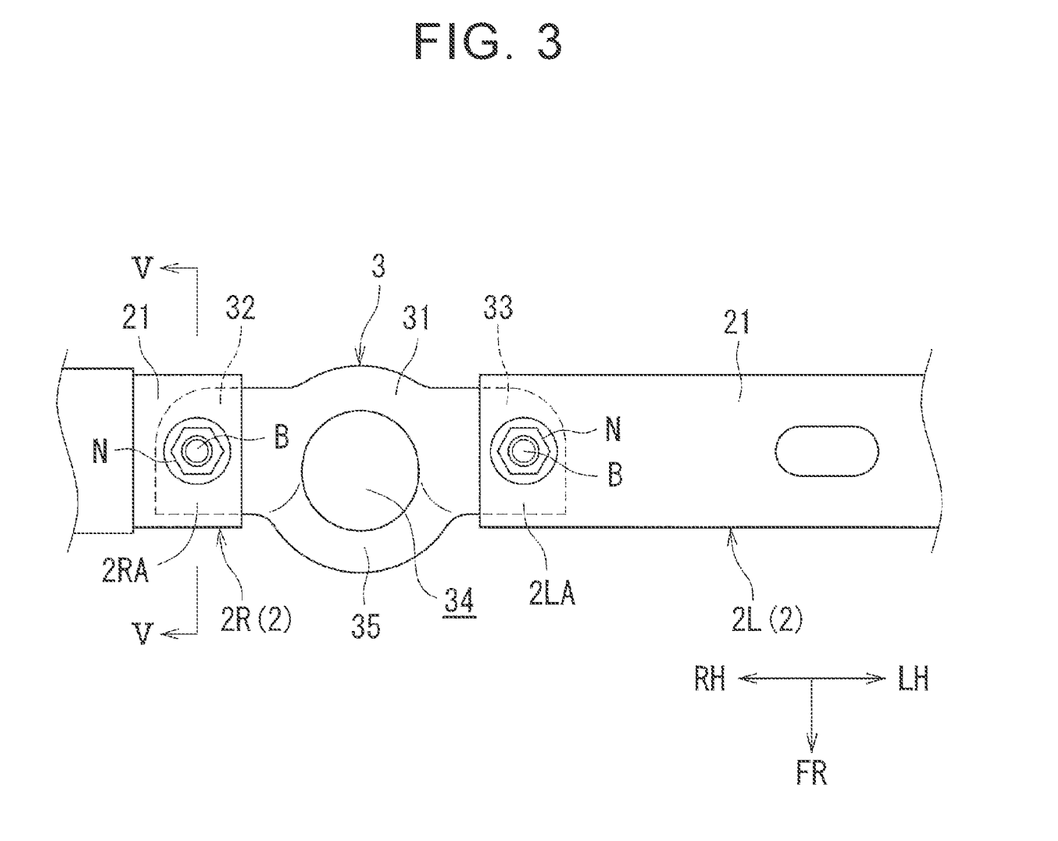
FIG. 3 is a plan view illustrating the peripheral area around the towing hook.
Figure 4:
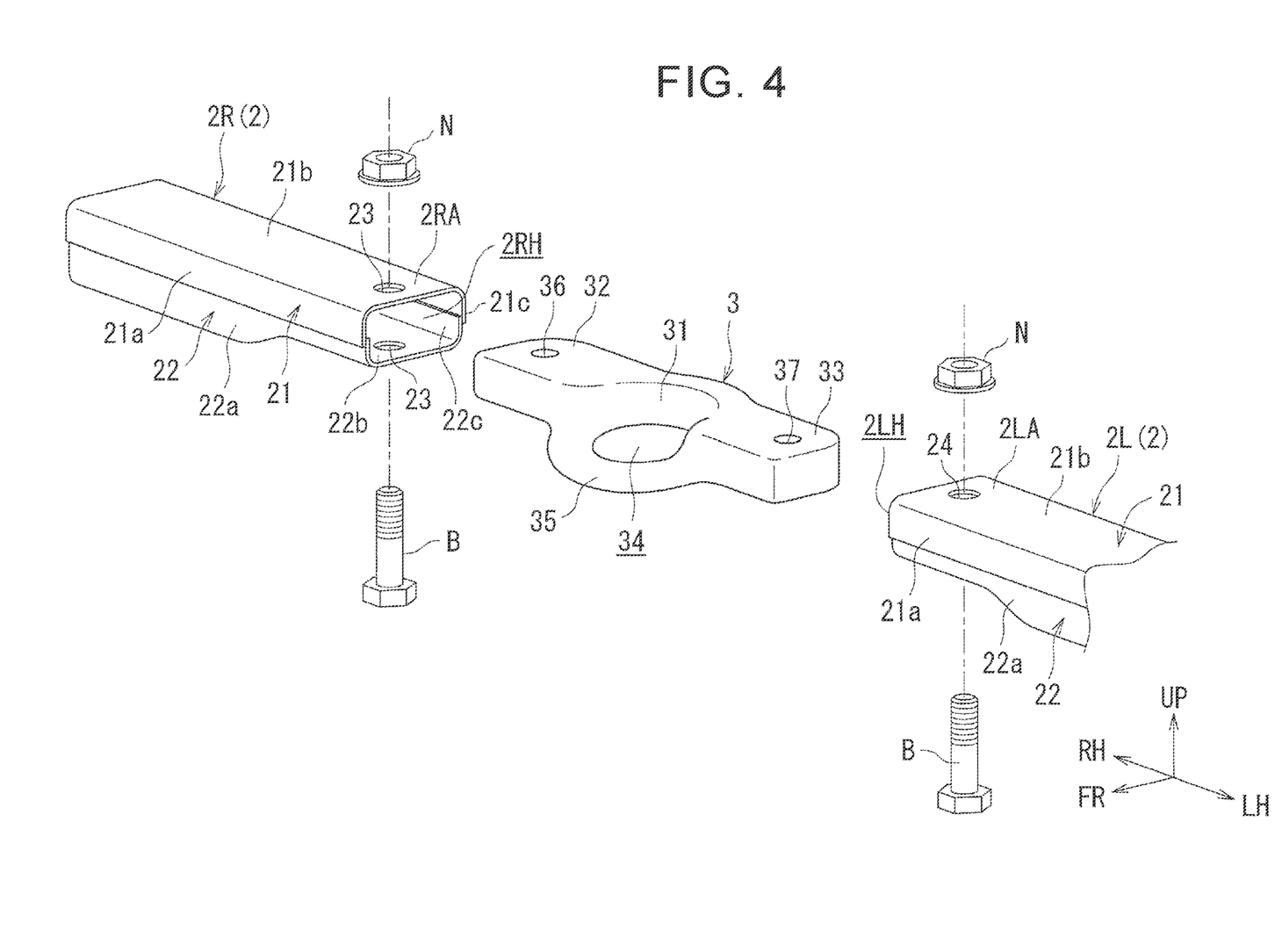
FIG. 4 is an exploded perspective view of a first crossmember and the towing hook.
Figure 5:
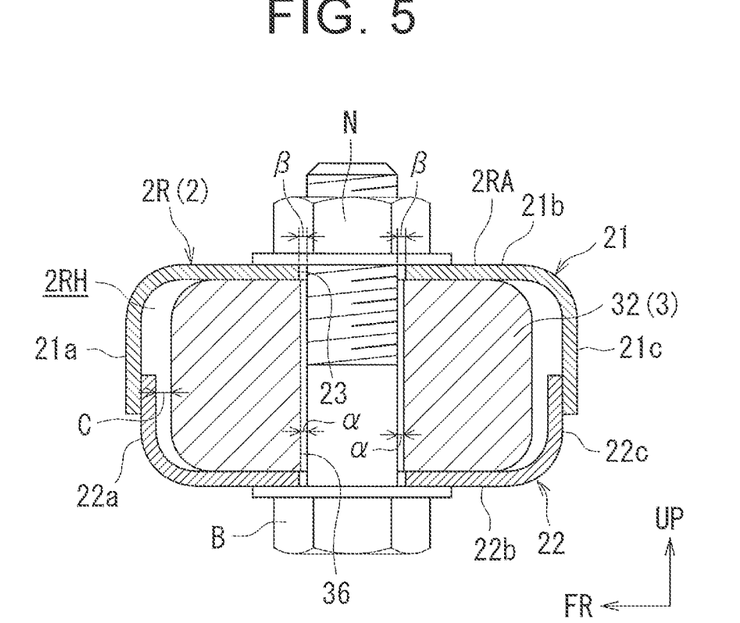
FIG. 5 is a sectional view taken along a line V-V in FIG. 3 in a state where a towing load is not input.

FIG. 2 is a perspective view illustrating a peripheral area around the towing hook 3. FIG. 3 is a plan view illustrating the peripheral area around the towing hook 3. Further, FIG. 4 is an exploded perspective view of the first crossmember 2 and the towing hook 3. Further, FIG. 5 is a sectional view taken along a line V-V in FIG. 3 in a state where a towing load is not input.

As illustrated in these figures, the towing hook 3 is disposed at a position closer to the right side than the center of the first crossmember 2 in the vehicle width direction.

Structure of First Crossmember

The first crossmember 2 is divided into a right crossmember 2R placed on the right side in the vehicle width direction, and a left crossmember 2L placed on the left side in the vehicle width direction relative to the right crossmember 2R. The crossmembers 2R, 2L are each constituted by a closed-section structure having a rectangular section by welding two metal plate materials to each other. More specifically, the crossmembers 2R, 2L are each configured such that a crossmember upper 21 having a sectional shape the lower side of which is opened is integrally joined to a crossmember lower 22 having a sectional shape the upper side of which is opened.

The crossmember upper 21 includes a front wall portion 21a placed on the front side in the vehicle-body front-rear direction, an upper plate portion 21b extending rearward in the vehicle-body front-rear direction from an upper edge of the front wall portion 21a, and a rear wall portion 21c extending downward from a rear edge of the upper plate portion 21b (an edge on the rear side in the vehicle-body front-rear direction).

In the meantime, the crossmember lower 22 includes a front wall portion 22a placed on the front side in the vehicle-body front-rear direction, a lower plate portion 22b extending rearward in the vehicle-body front-rear direction from a lower edge of the front wall portion 22a, and a rear wall portion 22c extending upward from a rear edge of the lower plate portion 22b (an edge on the rear side in the vehicle-body front-rear direction).

As illustrated in FIG. 5, an inner surface (a surface facing rearward in the vehicle-body front-rear direction) of a lower part of the front wall portion 21a of the crossmember upper 21 is welded, in an overlapped manner, to an outer surface (a surface facing forward in the vehicle-body front-rear direction) of an upper part of the front wall portion 22a of the crossmember lower 22, and an inner surface (a surface facing forward in the vehicle-body front-rear direction) of a lower part of the rear wall portion 21c of the crossmember upper 21 is welded, in an overlapped manner, to an outer surface (a surface facing rearward in the vehicle-body front-rear direction) of an upper part of the rear wall portion 22c of the crossmember lower 22. The crossmembers 2R, 2L each constituted by a rectangular closed-section structure are formed as such.

A left end part of the right crossmember 2R in the vehicle width direction serves as a towing hook fastening portion 2RA configured to fasten a right part (a right fastened portion 32 (described later)) of the towing hook 3. Further, a right end part of the left crossmember 2L in the vehicle width direction serves as a towing hook fastening portion 2LA configured to fasten a left part (a left fastened portion 33 (described later)) of the towing hook 3. That is, internal spaces 2RH, 2LH of the towing hook fastening portions 2RA, 2LA are formed as insertion holes extending along the vehicle width direction and opened in the vehicle width direction, and the fastened portions 32, 33 of the towing hook 3 are inserted into the internal spaces (insertion holes) 2RH, 2LH, respectively.

Bolt insertion holes 23 are formed in the towing hook fastening portion 2RA of the right crossmember 2R in a penetrating manner in the up-down direction. That is, the bolt insertion holes 23 having a round shape and penetrating in the up-down direction are formed in the upper plate portion 21b of the crossmember upper 21 and the lower plate portion 22b of the crossmember lower 22, the crossmember upper 21 and the crossmember lower 22 constituting the right crossmember 2R. The bolt insertion holes 23 are placed on an axis (on the same axis) extending in the up-down direction. For example, the bolt insertion holes 23 are formed at a central position, in the vehicle-body front-rear direction, of the upper plate portion 21b of the crossmember upper 21 and at a central position, in the vehicle-body front-rear direction, of the lower plate portion 22b of the crossmember lower 22.

Similarly, bolt insertion holes 24 are formed in the towing hook fastening portion 2LA of the left crossmember 2L in a penetrating manner in the up-down direction. That is, the bolt insertion holes 24 having a round shape and penetrating in the up-down direction are formed in the upper plate portion 21b of the crossmember upper 21 and the lower plate portion 22b of the crossmember lower 22, the crossmember upper 21 and the crossmember lower 22 constituting the left crossmember 2L. The bolt insertion holes 24 are also placed on an axis (on the same axis) extending in the up-down direction. For example, the bolt insertion holes 24 are formed at a central position, in the vehicle-body front-rear direction, of the upper plate portion 21b of the crossmember upper 21 and at a central position, in the vehicle-body front-rear direction, of the lower plate portion 22b of the crossmember lower 22.

Support Structure for First Crossmember

As illustrated in FIGS. 2 and 4, a support bracket 4R is joined to a right end of the right crossmember 2R. The support bracket 4R is a member via which the right crossmember 2R is connected to the right side rail 11. The support bracket 4R is constituted by a rectangular closed-section structure by welding two plate materials 41, 42, and the dimension of the support bracket 4R in the vehicle width direction is generally the same as the dimension of the side rail 11 in the vehicle width direction. A pair of right and left flanges 43, 44 joined to the side rail 11 is provided in an upper part of the support bracket 4R. The flange 43 placed on the right side in the vehicle width direction is joined to a right side face of the side rail 11 in an overlapped manner, and the flange 44 placed on the left side in the vehicle width direction is joined to a left side face of the side rail 11 in an overlapped manner. The joining position of the support bracket 4R to the side rail 11 is placed behind the connecting position of the crash box 12 to the side rail 11 (the position where the flanges 11d, 12a are connected in an overlapped manner) in the vehicle-body front-rear direction only by a predetermined dimension.

Further, flanges 45, 46 joined to the right crossmember 2R are provided in a lower part of the support bracket 4R. The flanges 45, 46 are joined to a top face, a front face, and a back face of the right crossmember 2R.

As such, the upper flanges 43, 44 are joined to the side rail 11, and the lower flanges 45, 46 are joined to the right crossmember 2R, so that the right crossmember 2R is supported by the right side rail 11 via the support bracket 4R.

Further, the support bracket 4R inclines forward in the vehicle-body front-rear direction from its upper part to its lower part. That is, a front face 47 and a rear face 48 of the support bracket 4R incline forward as they go downward. On this account, the right crossmember 2R is placed forward in the vehicle-body front-rear direction from the joining position of the support bracket 4R to the side rail 11 (the positions of the flanges 43, 44).

Note that the support structure for the left crossmember 2L is a support structure symmetric to the support structure for the right crossmember 2R described above. That is, a support bracket 4L is joined to a left end of the left crossmember 2L, and the left crossmember 2L is connected to the left side rail 11 via the support bracket 4L.

Structure of Towing Hook and Attachment Structure

As illustrated in FIG. 4, the towing hook 3 includes a hook body 31, the right fastened portion 32, and the left fastened portion 33. The towing hook 3 is a forged product of steel and configured such that the hook body 31, the right fastened portion 32, and the left fastened portion 33 are integrally molded by forging and molding.

The hook body 31 is molded in a toric shape. That is, the hook body 31 has an opening 34 in a center part of the hook body 31, and at the time of towing of the vehicle, a towing-side hook (not shown) extending from a towing-car side is inserted into the opening 34, and the towing-side hook is engaged with a locking portion 35 formed on the front side of the opening 34. At the time of towing of the vehicle by the towing car, a towing load is applied to the hook body 31 from the towing-side hook. Note that the inside-diameter dimension of the opening 34 and the sectional shape of the locking portion 35 are set appropriately in consideration of an engaging operation of the towing-side hook, the magnitude of a towing load, and so on.

The right fastened portion 32 is a part continuous with a right side portion of the hook body 31 and extending rightward in the vehicle width direction only by a predetermined dimension. The sectional shape of the right fastened portion 32 (a sectional shape in a direction perpendicular to the vehicle width direction) generally fits the sectional shape of the internal space 2RH of the towing hook fastening portion 2RA of the right crossmember 2R described above (see FIG. 5). Further, a bolt insertion hole 36 is formed in the right fastened portion 32 in a penetrating manner in the up-down direction. The formation position of the bolt insertion hole 36 is set, for example, at a central position, in the vehicle-body front-rear direction, of the right fastened portion 32. Further, the inside-diameter dimension of the bolt insertion hole 36 is set to be slightly larger than the outside-diameter dimension of a bolt B (described later). Note that the inside-diameter dimension of the bolt insertion holes 23 formed in the towing hook fastening portion 2RA of the right crossmember 2R is also set to be slightly larger than the outside-diameter dimension of the bolt B.

The right fastened portion 32 of the towing hook 3 configured as such is inserted into the internal space 2RH of the towing hook fastening portion 2RA of the right crossmember 2R, and the bolt B is inserted from the lower side in a state where the bolt insertion hole 36 formed in the right fastened portion 32 of the towing hook 3 is aligned with the bolt insertion holes 23 formed in the towing hook fastening portion 2RA of the right crossmember 2R. Then, a nut N is screwed to the bolt B from above the towing hook fastening portion 2RA of the right crossmember 2R. Thus, the right fastened portion 32 of the towing hook 3 is fastened to the towing hook fastening portion 2RA of the right crossmember 2R.

The left fastened portion 33 is a part continuous with a left side portion of the hook body 31 and extending leftward in the vehicle width direction only by a predetermined dimension. The sectional shape of the left fastened portion 33 (a sectional shape in a direction perpendicular to the vehicle width direction) generally fits the sectional shape of the internal space 2LH of the towing hook fastening portion 2LA of the left crossmember 2L described above. Further, a bolt insertion hole 37 is formed in the left fastened portion 33 in a penetrating manner in the up-down direction. The formation position of the bolt insertion hole 37 is set, for example, at a central position, in the vehicle-body front-rear direction, of the left fastened portion 33. Further, the inside-diameter dimension of the bolt insertion hole 37 is also set to be slightly larger than the outside-diameter dimension of a bolt B (described later). Note that the inside-diameter dimension of the bolt insertion holes 24 formed in the towing hook fastening portion 2LA of the left crossmember 2L is also set to be slightly larger than the outside-diameter dimension of the bolt B.

Similarly to the fastening structure of the right fastened portion 32 of the towing hook 3 described above, the left fastened portion 33 of the towing hook 3 is inserted into the internal space 2LH of the towing hook fastening portion 2LA of the left crossmember 2L, and the bolt B is inserted from the lower side in a state where the bolt insertion hole 37 formed in the left fastened portion 33 of the towing hook 3 is aligned with the bolt insertion holes 24 formed in the towing hook fastening portion 2LA of the left crossmember 2L. Then, a nut N is screwed to the bolt B from above the towing hook fastening portion 2LA of the left crossmember 2L. Thus, the left fastened portion 33 of the towing hook 3 is fastened to the towing hook fastening portion 2LA of the left crossmember 2L.

Here, the following describes one example of a state where the right fastened portion 32 of the towing hook 3 is fastened to the towing hook fastening portion 2RA of the right crossmember 2R, with reference to FIG. 5. As illustrated in FIG. 5, the inside-diameter dimension of the bolt insertion hole 36 formed in the right fastened portion 32 of the towing hook 3 is set to be larger than the outside-diameter dimension of the bolt B only by "2×α." That is, as illustrated in FIG. 5, the inside-diameter dimension of the bolt insertion hole 36 is set to a dimension in which respective gaps with a dimension α are formed in front of and rearward of the bolt B in a state where the bolt B is passed through the center of the bolt insertion hole 36 of the right fastened portion 32. Note that, in a case where the front side of the bolt B abuts with an inner surface of the bolt insertion hole 36 of the right fastened portion 32, a gap with a dimension of "2×α" is formed rearward of the bolt B.

Further, the inside-diameter dimension of the bolt insertion holes 23 formed in the towing hook fastening portion 2RA of the right crossmember 2R is set to be larger than the outside-diameter dimension of the bolt B by "2×β." That is, as illustrated in FIG. 5, the inside-diameter dimension of the bolt insertion holes 23 is set to a dimension in which respective gaps with a dimension β are formed in front of and rearward of the bolt B in a state where the bolt B is passed through the centers of the bolt insertion holes 23 of the right crossmember 2R. Note that, in a case where the rear side of the bolt B abuts with inner surfaces of the bolt insertion holes 23 of the right crossmember 2R, a gap with a dimension of "2×β" is formed in front of the bolt B.

The dimensions α and β described above are set such that the sum of these dimensions is generally equal to a dimension C between a front inner surface of the right crossmember 2R and a front face of the right fastened portion 32 of the towing hook 3 (α+β=C). The dimensions α and β can be set to any given values. Further, these dimensions may be set to the same value or may be set to different values. In the present embodiment, the dimension α is 0.5 mm, for example, and the dimension β is 1.0 mm, for example. These values are not limited to them.

Such a structure corresponds to "in a state where no towing load is applied to the towing hook, a sum of a dimension, in the vehicle-body front-rear direction, of a gap between an outer surface of the bolt and an inner surface of the bolt insertion hole formed in the fastened portion of the towing hook, the inner surface being on a side opposite to a side where the towing load is applied, and a dimension, in the vehicle-body front-rear direction, of a gap between the outer surface of the bolt and an inner surface of the bolt insertion hole formed in the towing hook fastening portion of the crossmember, the inner surface being on the side where the towing load is applied, is equal to a dimension, in the vehicle-body front-rear direction, of a gap between the fastened portion of the towing hook and an inner surface of the insertion hole formed in the towing hook fastening portion of the crossmember, the inner surface being on the side where the towing load is applied" as described in the present disclosure.

In such a structure, when a towing load is applied to the towing hook 3 to move the right fastened portion 32 leftward in the figure only by the dimension α, the inner surface of the bolt insertion hole 36 of the right fastened portion 32 abuts with an outer surface (a rear outer surface) of the bolt B, so that the bolt B moves leftward in the figure only by the dimension β together with the right fastened portion 32. Hereby, the front face of the right fastened portion 32 abuts with the inner surface of the towing hook fastening portion 2RA of the right crossmember 2R, and the outer surface (a front outer surface) of the bolt B abuts with the inner surfaces of the bolt insertion holes 23 formed in the towing hook fastening portion 2RA of the right crossmember 2R.

Note that a state where the left fastened portion 33 of the towing hook 3 is fastened to the towing hook fastening portion 2LA of the left crossmember 2L is similar to a state where the right fastened portion 32 of the towing hook 3 is fastened to the towing hook fastening portion 2RA of the right crossmember 2R.

As described above, the towing hook 3 is placed between the right crossmember 2R and the left crossmember 2L, and the fastened portions 32, 33 on both sides of the towing hook 3 are inserted into the internal spaces 2RH, 2LH of the towing hook fastening portions 2RA, 2LA of the crossmembers 2R, 2L and fastened by bolts. On this account, the fastened portions 32, 33 of the towing hook 3 are supported in a state where the fastened portions 32, 33 are sandwiched by the towing hook fastening portions 2RA, 2LA of the crossmembers 2R, 2L (sandwiched in the up-down direction). As a result, in comparison with a structure in the related art in which a towing hook is fastened to an outer surface of a crossmember by a bolt, the attachment strength of the towing hook 3 can be secured sufficiently. A towing load input into the towing hook 3 at the time of towing of the vehicle is transmitted to the crossmembers 2R, 2L via the fastened portions 32, 33 and the bolts B, and even in a state where the towing load is large, the towing load can be received in a large range, so that the towing can be performed successfully. With such a structure, it is possible to sufficiently secure the attachment strength of the towing hook 3. Accordingly, even when a bolt with a small outside-diameter dimension (a bolt with a smaller outside-diameter dimension than that of a bolt generally used in the related art) is used as the bolt B, it is possible to sufficiently secure the attachment strength.

Input of Towing Load

Next will be described a case where towing is performed by engaging the towing-side hook extending from the towing-car side with the towing hook 3.

Figure 6:
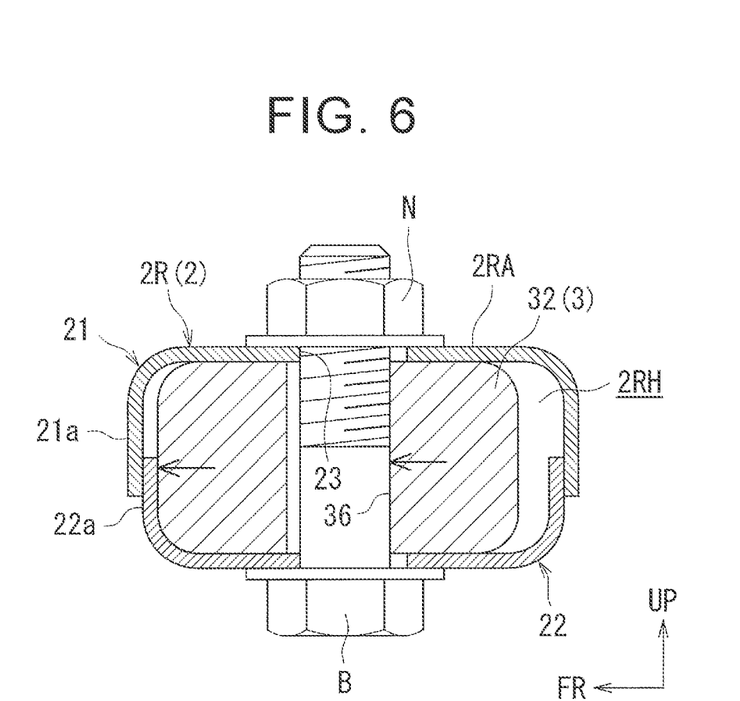
FIG. 6 is a drawing corresponding to FIG. 5 in a state where the towing load is input.

FIG. 6 is a drawing corresponding to FIG. 5 in a state where a towing load is input. When a towing load is applied from a state where no towing load is input as illustrated in FIG. 5, a gap between the rear outer surface of the bolt B and the inner surface of the bolt insertion hole 36 of the right fastened portion 32 of the towing hook 3 is reduced as illustrated in FIG. 6 first due to a relative movement (a leftward movement in FIGS. 5, 6) of the towing hook 3 to the bolt B, so that the right fastened portion 32 of the towing hook 3 abuts with the rear outer surface of the bolt B. When the towing load is further applied, a gap between the inner surfaces of the bolt insertion holes 23 of the towing hook fastening portion 2RA of the right crossmember 2R and the front outer surface of the bolt B is reduced due to a relative movement (a leftward movement in FIGS. 5, 6) of the bolt B to the right crossmember 2R, so that the front outer surface of the bolt B abuts with the towing hook fastening portion 2RA of the right crossmember 2R. That is, the towing load input into the towing hook 3 is transmitted to the bolt B from the right fastened portion 32 of the towing hook 3 and is transmitted from the bolt B to the towing hook fastening portion 2RA of the right crossmember 2R. At the same time, the front face of the right fastened portion 32 of the towing hook 3 abuts with the inner surface of the towing hook fastening portion 2RA of the right crossmember 2R (the front inner surface of the internal space 2RH of the towing hook fastening portion 2RA), so that the towing load is directly transmitted from the front face of the right fastened portion 32 of the towing hook 3 to the inner surface of the towing hook fastening portion 2RA of the right crossmember 2R. Such an operation also occurs in a part where the left fastened portion 33 of the towing hook 3 is fastened to the towing hook fastening portion 2LA of the left crossmember 2L. Hereby, the towing load can be received by these members, so that towing can be performed successfully. Particularly, since the towing load is directly transmitted from the front face of the right fastened portion 32 of the towing hook 3 to the inner surface of the towing hook fastening portion 2RA of the right crossmember 2R, it is possible to achieve an increase in the towing load to be received by the right crossmember 2R. This also allows the towing to be performed successfully.

Other Effects

Next will be described other effects obtained when the towing hook 3 is attached to the first crossmember 2 as described above.

In a case where a towing hook is fastened to an outer surface of a crossmember like the related art, a locking portion (a part to which a towing-side hook extending from a towing-car side is locked) of the towing hook is placed forward of the crossmember. As a result, there is such a possibility that a collision object (a barrier in an impact test) makes contact with the towing hook before a crash box is completely crushed by a collision load at the time of a vehicle front collision, and the collision load is input into the towing hook, the crossmember, and a part of a side rail, the part being placed rearward from the connecting position where the crossmember is connected to the side rail, so that those members are broken. Further, it is conceivable that the towing hook is placed to face diagonally downward (diagonally downward toward the front side in the vehicle-body front-rear direction) as means to place a front end position of the towing hook rearward while the magnitude of the towing hook is secured to some extent. However, in this case, the position of the towing hook might be placed below a line of a so-called approach angle, so that the towing hook might interfere with a road surface at the time of hill-climbing traveling. In order to avoid such problems, it is necessary to extend the side rail forward, or it is necessary to place the crossmember rearward in the vehicle-body front-rear direction so as to place the towing hook rearward in the vehicle-body front-rear direction. In a case where the side rail is extended forward, the length of the vehicle body in the front-rear direction should be lengthened, and this greatly impairs a degree of freedom in design of the front part of the vehicle body. In a case where the crossmember is placed rearward in the vehicle-body front-rear direction and the towing hook is also placed rearward in the vehicle-body front-rear direction, the crossmember and the towing hook might interfere with a member (e.g., a radiator or the like) placed behind them. Particularly, in a case of a vehicle including the vehicle body frame 1 provided as a ladder frame like the present embodiment, the first crossmember 2 and the towing hook 3 are constituent components of the vehicle body frame 1 while the radiator is a constituent component on a body side. This might cause such a problem that the vehicle body frame 1 and the body move relative to each other due to vibrations of the vehicle body or the like, and the towing hook might interfere with the radiator and so on in a case where they are placed adjacently.

The present embodiment can solve such problems. The following describes this point more specifically.

Figure 7:
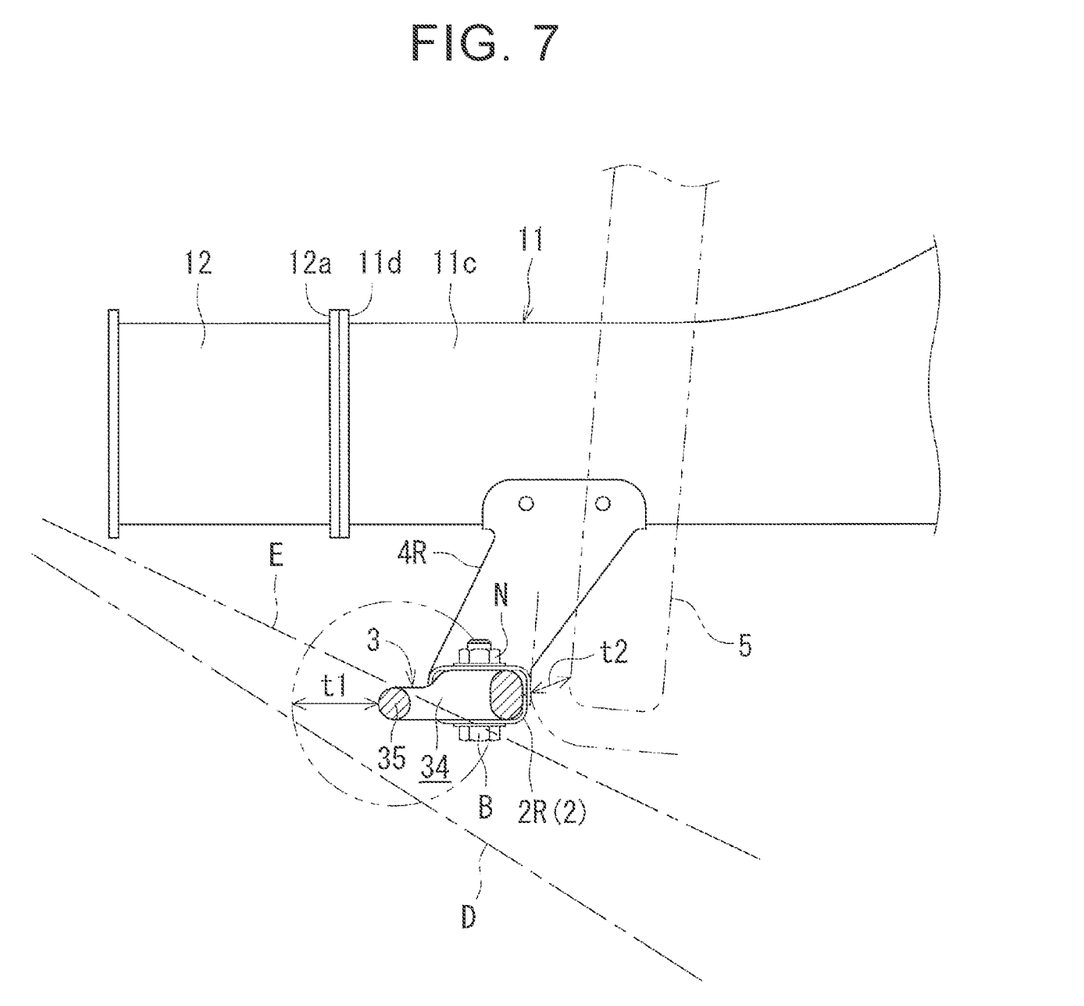
FIG. 7 is a sectional view taken along a line VII-VII in FIG. 1 and illustrates a vehicle body structure around the towing hook.

FIG. 7 is a sectional view along a line VII-VII in FIG. 1 and illustrates a vehicle body structure around the towing hook 3.

In the present embodiment, the towing hook 3 is placed between the right and left crossmembers 2R, 2L, so that the position of the towing hook 3 in the vehicle-body front-rear direction overlaps the positions of the crossmembers 2R, 2L in the vehicle-body front-rear direction. On this account, in comparison with the case where the towing hook is fastened to the outer surface of the crossmember like the related art (a structure in which the position of the towing hook in the vehicle-body front-rear direction does not overlap the position of the crossmember in the vehicle-body front-rear direction and the locking portion (a part to which the towing-side hook extending from the towing-car side is locked) of the towing hook is placed greatly forward of the crossmember), the front end position of the towing hook 3 can be placed rearward. In order to highly obtain usability of the towing hook 3, it is necessary to secure the magnitude of the towing hook 3 to some extent. However, in the present embodiment, it is possible to place the front end position of the towing hook 3 rearward while the magnitude of the towing hook 3 is secured to some extent (the front end position of the towing hook 3 can be placed rearward as compared to the towing hook in the related art without changing the position of the first crossmember 2). On this account, a collision load at the time of a vehicle front collision (e.g., at the time of a minor collision) can be successfully absorbed by the crash box 12 by inputting the collision load into the front end portion (the crash box 12) of the vehicle body frame 1. Hereby, it is possible to restrain a collision object from reaching the position of the towing hook 3, without employing means in which the length of the crash box 12 in the vehicle-body front-rear direction is lengthened so as to increase a collision load absorption region. On this account, it is possible to avoid or restrain input of a collision load into the first crossmember 2 or a part of the vehicle body frame 1 (a part of the vehicle body frame 1 that is placed rearward from the connecting position of the first crossmember 2), the part being placed rearward from the first crossmember 2. In other words, even in a case where a collision load is applied to the crash box 12 at the time of a vehicle front collision, and the crash box 12 is completely crushed due to compressive deformation, it is possible to prevent the collision object from making contact with the towing hook 3. That is, it is possible to restrain such a situation that a collision load is input into the towing hook 3 even though the crash box 12 is not completely crushed (a state where the collision load is still absorbable by the crash box 12). Note that, in the present embodiment, a space (a space used for a locking operation of the towing-side hook) is provided around the towing hook 3 only by a dimension t1 (e.g., 50 mm) in FIG. 7, so that the usability of the towing hook 3 is highly obtained.

Further, it is conceivable that the towing hook is placed to face diagonally downward as described above, as means to place the front end position of the towing hook 3 rearward while the magnitude of the towing hook 3 is secured to some extent. However, in this case, the position of the towing hook might be placed below a line of a so-called approach angle (an alternate long and short dash line D in FIG. 7). In the present embodiment, without placing the towing hook 3 to face diagonally downward, the front end position of the towing hook 3 can be placed rearward while the magnitude of the towing hook 3 is secured to some extent. Accordingly, it is possible to restrain the position of the towing hook 3 from being placed below the line of the approach angle, thereby making it possible to restrain the towing hook 3 from interfering with a road surface at the time of hill-climbing traveling. Further, in comparison with a case where the towing hook is placed to face diagonally downward or a case where the towing hook is fastened to the bottom face of the crossmember (JP 2019-64516 A), the ground clearance of the disposition position of the towing hook 3 can be set to be high. This also makes it possible to restrain the towing hook 3 from interfering with a road surface.

Further, in the related art, the towing hook is placed forward from the crossmember, and it is necessary to change the position of the crossmember to rearward so that the position of the towing hook is placed rearward. However, in the present embodiment, the position of the towing hook 3 in the vehicle-body front-rear direction overlaps the position of the first crossmember 2 in the vehicle-body front-rear direction, and hereby, it is possible to place the position of the towing hook 3 rearward without changing the position of the first crossmember 2 to rearward. On this account, it is possible to effectively prevent interference with a member (e.g., a radiator 5 or the like) placed behind the first crossmember 2 or the towing hook 3. In the present embodiment, a clearance is provided between the towing hook 3 and the radiator 5 only by a dimension t2 (e.g., 20 mm) in FIG. 7, and this restrains interference between them.

As such, in the present embodiment, while a restriction on the front side (such a situation that a collision object reaches the position of the towing hook 3 before the crash box 12 is completely crushed is not caused), a restriction on the lower side (the towing hook 3 is not placed below the line of the approach angle, and the ground clearance of the disposition position of the towing hook 3 is secured sufficiently), and a restriction on the rear side (the towing hook 3 does not interfere with the radiator 5) are all satisfied as restrictions on the disposition position of the towing hook 3, it is possible to secure excellent usability of the towing hook 3. Further, as described earlier, it is not necessary to lengthen the length of the crash box 12 in the vehicle-body front-rear direction, so that the degree of freedom in design of the front part of the vehicle body can be obtained sufficiently. Further, at the time of towing of the vehicle, a wire via which the towing-car side is connected to the towing-side hook may not necessarily extend horizontally, and the wire may extend to be inclined upward toward the front side of the vehicle body as indicated by an alternate long and short dash line E in FIG. 7. At this time, in a case where the length of the crash box 12 in the vehicle-body front-rear direction is lengthened, the position of a front bumper is placed on the front side, and this causes such a possibility that the wire makes contact with the front bumper. In the present embodiment, it is not necessary to lengthen the length of the crash box 12 in the vehicle-body front-rear direction as described above. This makes it possible to restrain the wire from making contact with the front bumper.

Further, in the present embodiment, as described above, the joining positions of the support brackets 4R, 4L to the side rails 11 are placed rearward in the vehicle-body front-rear direction from the connecting positions of the crash boxes 12 to the side rails 11 only by a predetermined dimension. The positions where the support brackets 4R, 4L are joined in the side rails 11 are reinforced by the support brackets 4R, 4L, so that an absorption function of a collision load by compressive deformation is low. However, in the present embodiment, since the joining positions of the support brackets 4R, 4L to the side rails 11 are placed rearward in the vehicle-body front-rear direction from the connecting positions of the crash boxes 12 to the side rails 11 only by the predetermined dimension, a collision load that cannot be absorbed by the crash boxes 12 can be absorbed by compressive deformation of parts of the side rails 11 that are placed forward from the joining positions of the support brackets 4R, 4L to the side rails 11. Hereby, it is possible to restrain such a situation that the collision load is transmitted to the rear sides of the side rails 11 and a range of the compressive deformation in the side rails 11 is enlarged.

Other Embodiments

Note that the present disclosure is not limited to the above embodiment, and all modifications and alterations within the scope of Claims and within a scope equivalent thereto are performable.

For example, the above embodiment deals with a case where the present disclosure is applied as the attachment structure for the front towing hook 3 attached to the vehicle body frame 1 provided as a so-called ladder frame. However, the present disclosure is not limited to this, and the present disclosure can be applied as an attachment structure for a towing hook attached to a vehicle body constituted by a monocoque structure. Further, the present disclosure can be applied as an attachment structure for a rear towing hook. Further, the number of towing hooks 3 to be attached is not limited to one, and two towing hooks 3 may be disposed on the opposite sides in the vehicle width direction.

Further, in the above embodiment, the towing hook 3 is fastened such that the fastened portions 32, 33 of the towing hook 3 are inserted into the crossmembers 2R, 2L. However, the present disclosure is not limited to this, and respective insertion holes extending along the vehicle width direction may be formed in the fastened portions 32, 33 of the towing hook 3, and the towing hook 3 may be fastened such that the towing hook fastening portions 2RA, 2LA of the crossmembers 2R, 2L are inserted into the insertion holes.

Further, in the above embodiment, the bolt insertion holes 23, 24 formed in the towing hook fastening portions 2RA, 2LA of the crossmember 2R, 2L and the bolt insertion holes 36, 37 formed in the fastened portions 32, 33 of the towing hook 3 are provided in a penetrating manner in the up-down direction. That is, the bolts B are fastened by being passed through the bolt insertion holes in the up-down direction. However, the present disclosure is not limited to this, and respective bolt insertion holes may be formed in the towing hook fastening portions 2RA, 2LA of the crossmembers 2R, 2L in a penetrating manner in the vehicle-body front-rear direction, and respective bolt insertion holes may be formed in the fastened portions 32, 33 of the of the towing hook 3 in a penetrating manner in the vehicle-body front-rear direction, so that the towing hook 3 is fastened such that respective bolts are passed through those bolt insertion holes.

Further, in the above embodiment, the towing hook 3 is fastened such that the fastened portions 32, 33 on both sides of the towing hook 3 are inserted into the towing hook fastening portions 2RA, 2LA of the crossmembers 2R, 2L. However, the present disclosure is not limited to this, and the fastened portion 32 (33) may be provided only on a first side of the towing hook 3 in the vehicle width direction, and the towing hook 3 may be fastened such that the fastened portion 32 (33) is inserted into the towing hook fastening portion 2RA (2LA) of a first crossmember 2R (2L). In this case, a second side of the towing hook 3 in the vehicle width direction may be joined to a second crossmember 2L (2R) by means such as welding.

Further, in the above embodiment, the inside-diameter dimensions of the bolt insertion holes 23, 24, 36, 37 formed in the towing hook fastening portions 2RA, 2LA of the crossmembers 2R, 2L and the fastened portions 32, 33 of the towing hook 3 are set to be larger than the outside-diameter dimension of the bolt B. However, the present disclosure is not limited to this, and the inside-diameter dimension of the bolt insertion holes 23, 24 formed in the towing hook fastening portions 2RA, 2LA of the crossmembers 2R, 2L may be equal to the outside-diameter dimension of the bolt B, or the inside-diameter dimension of the bolt insertion holes 36, 37 formed in the fastened portions 32, 33 of the towing hook 3 may be equal to the outside-diameter dimension of the bolt B. That is, no gap is provided between the members, so that the members do not move relative to each other at the time when a towing load is input.

Further, in the above embodiment, the towing hook 3 is a forged product of steel. However, the present disclosure is not limited to this, and the towing hook 3 may be made of a steel sheet or may be molded by casting. Further, components of the towing hook 3 are not limited in particular.

The present disclosure is applicable to a towing hook attachment structure in which a towing hook is fastened to a crossmember of a vehicle body.

What is claimed is:

1. A towing hook attachment structure in which a towing hook is fastened to a crossmember of a vehicle body, the towing hook attachment structure comprising the towing hook, wherein:
    the crossmember is provided with a towing hook fastening portion;
    the towing hook is provided with a fastened portion;
    either one of the towing hook fastening portion of the crossmember and the fastened portion of the towing hook has an insertion hole extending along a vehicle width direction and opening in the vehicle width direction;
    the other one of the towing hook fastening portion of the crossmember and the fastened portion of the towing hook is inserted into the insertion hole;
    the fastened portion of the towing hook is fastened to the towing hook fastening portion of the crossmember such that a bolt is passed through respective bolt insertion holes formed in the towing hook fastening portion and the fastened portion in an aligned manner;
    the insertion hole is provided in the towing hook fastening portion of the crossmember;
    the fastened portion of the towing hook is inserted into the insertion hole;
    the crossmember is divided into a right crossmember and a left crossmember;
    a left end part of the right crossmember in the vehicle width direction and a right end part of the left crossmember in the vehicle width direction serve as a plurality of the towing hook fastening portions;
    the towing hook fastening portions have respective insertion holes extending along the vehicle width direction and opening in the vehicle width direction;
    a right end part and a left end part of the towing hook in the vehicle width direction serve as a plurality of the fastened portions;
    one of the fastened portions that is the right end part of the towing hook in the vehicle width direction is inserted into the insertion hole of the towing hook fastening portion of the right crossmember and is fastened by a right bolt;
    the other of the fastened portions that is the left end part of the towing hook in the vehicle width direction is inserted into the insertion hole of the towing hook fastening portion of the left crossmember and is fastened by a left bolt;
    a center of the towing hook in a vehicle front-rear direction is located between the right end part of the left crossmember and the left end part of the right crossmember in the vehicle width direction when the fastened portions are fastened to the towing hook fastening portions respectively;
    the towing hook has an opening;
    at a time of towing of the vehicle, a towing-side hook extending from a towing-car side is inserted into the opening; and
    in a vehicle-body front-rear direction, a rear end of the opening is disposed rearward of rear ends of the bolt insertion holes formed in the fastened portions.

2. The towing hook attachment structure according to claim 1, wherein inside-diameter dimensions of the bolt insertion holes formed in the towing hook fastening portion of the crossmember and the fastened portion of the towing hook are set to be larger than an outside-diameter dimension of the bolt.

3. The towing hook attachment structure according to claim 1, wherein, in a state where no towing load is applied to the towing hook, a sum of a dimension, in the vehicle-body front-rear direction, of a gap between an outer surface of the bolt and an inner surface of the bolt insertion hole formed in the fastened portion of the towing hook, the inner surface being on a side opposite to a side where the towing load is applied, and a dimension, in the vehicle-body front-rear direction, of a gap between the outer surface of the bolt and an inner surface of the bolt insertion hole formed in the towing hook fastening portion of the crossmember, the inner surface being on the side where the towing load is applied, is equal to a dimension, in the vehicle-body front-rear direction, of a gap between the fastened portion of the towing hook and an inner surface of the insertion hole formed in the towing hook fastening portion of the crossmember, the inner surface being on the side where the towing load is applied.

4. The towing hook attachment structure according to claim 1, wherein:
    the right bolt fastens a right towing hook fastening portion and a right fastened portion;
    the left bolt fastens a left towing hook fastening portion and a left fastened portion;
    the towing hook fastening portions include the right towing hook fastening portion of the right crossmember and the left towing hook fastening portion of the left crossmember; and
    the fastened portions include the right fastened portion and the left fastened portion.

5. The towing hook attachment structure according to claim 4, wherein the rear end of the opening is disposed rearward of rear ends of the right bolt and left bolt in the vehicle-body front-rear direction.

* * * * *